July 24, 1962   J. J. KOTTE   3,045,538
FILM GUIDE FOR FILM PROJECTOR
Filed June 29, 1959

INVENTOR
JAN JACOB KOTTE

BY
AGENT 3,045,538
FILM GUIDE FOR FILM PROJECTOR
Jan Jacob Kotte, Eindhoven, Netherlands, assignor to North American Philips Company, Inc., New York, N.Y., a corporation of Delaware
Filed June 29, 1959, Ser. No. 823,613
Claims priority, application Netherlands Aug. 14, 1958
3 Claims. (Cl. 88—17)

The present invention relates to a film projector device and more particularly to a film guide having interchangeable strips of friction material mounted on either side of the film gate.

Since the film is ordinarily held with some force against the strips and led along the strips, these strips are subject to wear. It is therefore necessary for the strips, after a certain number of operating hours, either to be replaced by new ones or lined with new friction material.

An object of the present invention is to use friction strips for a greater number of operating hours than that which is possible with known strips.

According to the invention, each strip is formed symmetrically with respect to its longitudinal axis and, in the mounted position, the distance between the axes of symmetry in the direction of length of the strips is at least equal to the width of the film.

The invention affords the advantage that the two strips on each side of the film are interchangeable and, as a result of such interchange, a new strip running surface for the film is obtained. If therefore, the original running surface would be worn to an extent such that it is required to be renewed, the operator need only interchange the strips on each side of the film. Since in the mounted position the distance between the axes of symmetry in the direction of length of the strips is at least equal to the width of the film, it is ensured that the running surfaces of a strip do not overlap after interchanging.

If desired, it is alternatively possible with the strips according to the invention to turn a strip by 180° about its longitudinal axis and then to amount it again. This is only efficacious if each strip has four running surfaces.

According to another feature of the invention, each strip is also formed symmetrically with respect to an axis at right angles to its longitudinal axis.

It is thus rendered possible to turn a strip at one side of the film so that its lower end lies above and its upper end lies below. In this way also it is ensured that a new running surface is in the operative position which does not overlap the old one.

In order that the invention may be readily carried into effect, one embodiment will now be described in detail, by way of example, with reference to the accompanying drawing in which FIG. 1 is a front elevation of a fixed film guide provided with a sprocket drum for the film.

Figure 1:
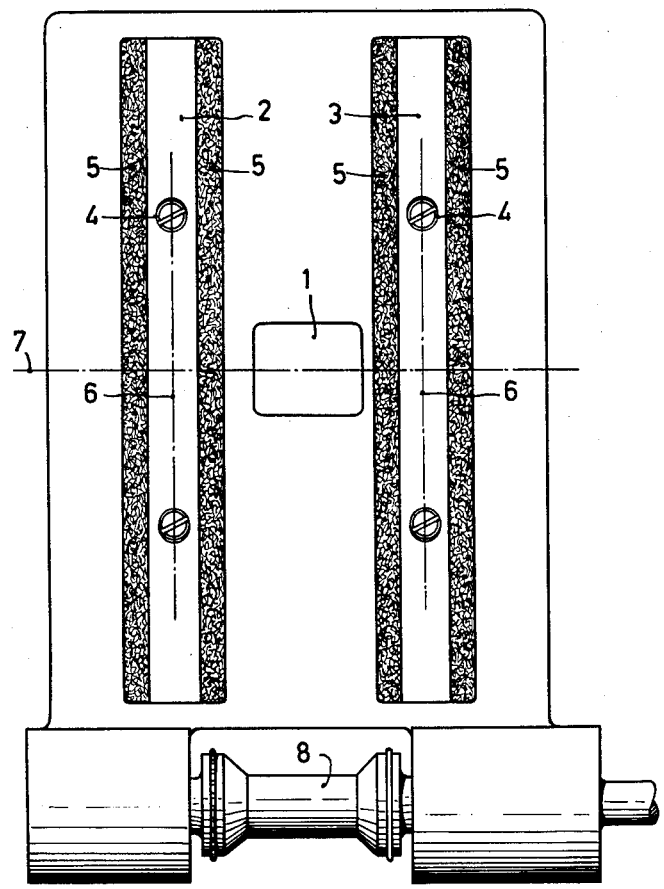
Figure 2:
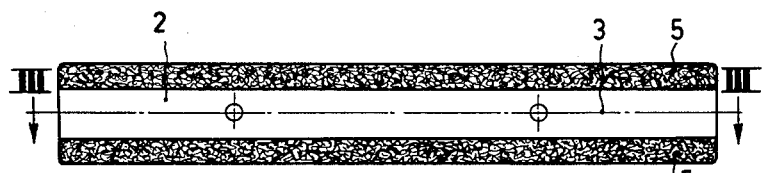
FIG. 2 is an elevation view of the rear side of each of the strips 2 and 3.
Figure 3:
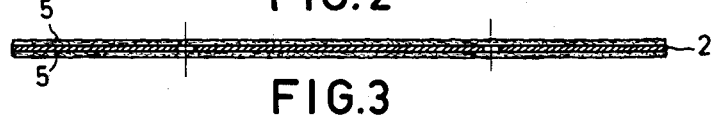
FIG. 3 is a view taken along the lines III—III of FIG. 2.

Referring to the drawing, strips 2, 3 are secured by means of threaded bolts 4 to the frame structure, one on each side of a projection aperture 1. Each of the strips 2, 3 is provided with band 5 of friction material such, for example, as velvet. The strips are formed symmetrically both with respect to the axis 6 and the axis 7 whereby the strips 2 and 3 are interchangeable, so that the strip 3 may be secured at the area of strip 2 and strip 2 may be secured at the area of strip 3. As an alternative, it is possible for the strips 2, 3 to be turned in the plane of drawing so that their lower ends come to lie above. In addition, each of the strips 2, 3 may be turned over about its longitudinal axis so that the back of the strip comes to lie in front. A sprocket drum 8 provides for the movement of the film along the fixed film guide.

Thus, the strips 2 and 3 may be interchanged and reversed in several different ways thereby materially increasing the active life of each set of strips.

What is claimed is:

1. A film device comprising a pair of spaced guide plates for the film, a projection aperture located between said spaced guide plates, a film feed device, each guide plate having at least two spaced, elongated strips of friction material, said strips being parallel to the longitudinal axis of the guide plate, and in the mounted position the distance between the longitudinal axes of said guide plates being at least equal to the width of the film and said guide plates being movable to change the position of said strips.

2. A film device comprising a pair of spaced guide plates for the film, a projection aperture located between said spaced guide plates, a film feed device, each guide plate having at least two spaced, elongated strips of velvet material, said strips being parallel to the longitudinal axis of the guide plate, and in the mounted position the distance between the longitudinal axes of said guide plates being at least equal to the width of the film, and said guide plates with respective strips being interchangeable with respect to position in said film device.

3. A film device as claimed in claim 1 wherein said strips of friction material are secured to both the front and back sides of said guide plates.

References Cited in the file of this patent
UNITED STATES PATENTS

| | | |
|---|---|---|
| 1,815,486 | Serrurier | July 21, 1931 |
| 2,192,641 | Griffin et al. | Mar. 5, 1940 |
| 2,192,692 | Nerwin | Mar. 5, 1940 |
| 2,199,305 | Dewey | Apr. 30, 1940 |
| 2,431,681 | Barstow | Dec. 2, 1947 |

FOREIGN PATENTS

| | | |
|---|---|---|
| 819,821 | France | July 19, 1937 |
| 1,073,649 | France | Mar. 24, 1954 |